United States Patent
Kaneko et al.

(10) Patent No.: US 10,661,741 B2
(45) Date of Patent: May 26, 2020

(54) CRASH BOX AND MANUFACTURING METHOD OF THE SAME

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama (JP)

(72) Inventors: Takanobu Kaneko, Kariya (JP); Takafumi Hayashi, Kariya (JP); Katsuhiko Nakajo, Kariya (JP); Kiyoichi Kita, Imizu (JP); Jun Shobo, Imizu (JP); Tamaki Obayashi, Imizu (JP); Kyosuke Matsui, Imizu (JP)

(73) Assignees: Aisin Seiki Kabushiki Kaisha, Kariya-shi, Aichi-ken (JP); Aisin Keikinzoku Kabushiki Kaisha, Imizu-shi, Toyama (JP)

( * ) Notice: Subject to any disclaimer, the term of this patent is extended or adjusted under 35 U.S.C. 154(b) by 0 days.

(21) Appl. No.: 16/087,847

(22) PCT Filed: Dec. 9, 2016

(86) PCT No.: PCT/JP2016/086691
§ 371 (c)(1),
(2) Date: Sep. 24, 2018

(87) PCT Pub. No.: WO2017/163502
PCT Pub. Date: Sep. 28, 2017

(65) Prior Publication Data
US 2019/0111873 A1    Apr. 18, 2019

(30) Foreign Application Priority Data

Mar. 25, 2016 (JP) .................. 2016-061400

(51) Int. Cl.
*B60R 19/34* (2006.01)
*B62D 21/15* (2006.01)
(Continued)

(52) U.S. Cl.
CPC .............. *B60R 19/34* (2013.01); *B21D 22/20* (2013.01); *B21D 53/88* (2013.01); *B62D 21/15* (2013.01); *F16F 7/00* (2013.01); *F16F 7/12* (2013.01)

(58) Field of Classification Search
CPC ... B60R 19/34; B60R 2019/262; B62D 21/15; B21D 22/20; B21D 53/88; F16F 7/00; F16F 7/003; F16F 7/12
(Continued)

(56) References Cited

U.S. PATENT DOCUMENTS

| 7,344,008 B1 | 3/2008 | Jonsson et al. |
| 2007/0181393 A1* | 8/2007 | Suzuki .................... B60R 19/34 188/377 |

(Continued)

FOREIGN PATENT DOCUMENTS

| EP | 0 763 448 | 3/1997 |
| JP | 2003-312401 | 11/2003 |

(Continued)

*Primary Examiner* — Gregory A Blankenship
(74) *Attorney, Agent, or Firm* — Finnegan, Henderson, Farabow, Garrett & Dunner, LLP

(57) ABSTRACT

There is provided a crash box comprising a pedestal portion attached to one of two members that are placed in an inward-outward direction of a vehicle; and a bottomed tubular portion integrally molded with the pedestal portion and configured to include a base end portion that is arranged to rise from the pedestal portion and an extended portion that is extended from the base end portion and that has a leading end wall which forms a bottom of the tubular portion and which is attached to the other of the two members, wherein the tubular portion is configured such that a side wall of the (Continued)

extended portion has a smaller thickness than a thickness of a side wall of the base end portion.

4 Claims, 4 Drawing Sheets

(51) Int. Cl.
*F16F 7/12* (2006.01)
*B21D 22/20* (2006.01)
*F16F 7/00* (2006.01)
*B21D 53/88* (2006.01)

(58) Field of Classification Search
USPC .......................................................... 293/133
See application file for complete search history.

(56) References Cited

U.S. PATENT DOCUMENTS

| 2008/0238146 | A1 | 10/2008 | Nusier et al. | |
|---|---|---|---|---|
| 2012/0025546 | A1* | 2/2012 | Haneda | B21D 39/032 |
| | | | | 293/132 |
| 2012/0025547 | A1* | 2/2012 | Haneda | B60R 19/34 |
| | | | | 293/133 |
| 2013/0001963 | A1* | 1/2013 | Haneda | B60R 19/34 |
| | | | | 293/133 |
| 2013/0076052 | A1* | 3/2013 | Kaneko | B60R 19/34 |
| | | | | 293/133 |
| 2013/0099514 | A1* | 4/2013 | Kaneko | B60R 19/34 |
| | | | | 293/133 |
| 2014/0366997 | A1* | 12/2014 | Kamat | C22F 1/05 |
| | | | | 148/551 |
| 2015/0061307 | A1* | 3/2015 | Nakanishi | B60R 19/34 |
| | | | | 293/133 |
| 2016/0375935 | A1* | 12/2016 | Tyan | B62D 21/15 |
| | | | | 296/205 |
| 2017/0016503 | A1* | 1/2017 | Teshima | B60R 19/34 |
| 2017/0197571 | A1* | 7/2017 | Baccouche | B60R 19/34 |
| 2017/0217393 | A1* | 8/2017 | Mohapatra | B60R 19/34 |
| 2018/0281715 | A1* | 10/2018 | Lu | B60R 19/34 |
| 2018/0304841 | A1* | 10/2018 | Lu | B60R 19/03 |
| 2019/0111873 | A1* | 4/2019 | Kaneko | B62D 21/15 |
| 2019/0152415 | A1* | 5/2019 | Tung | B60R 19/34 |

FOREIGN PATENT DOCUMENTS

| JP | 2006-347265 | 12/2006 | |
|---|---|---|---|
| JP | 2011-057157 | 3/2011 | |
| JP | 2013-208652 | 10/2013 | |
| JP | 2002-542982 | 12/2017 | |
| WO | WO 2016/012977 | * 1/2016 | ............ B60R 19/34 |

* cited by examiner

CRASH BOX AND MANUFACTURING METHOD OF THE SAME

This is a national phase application of PCT/JP2016/086691 filed Dec. 9, 2016, claiming priority to Japanese Patent Application No. JP2016-061400 filed Mar. 25, 2016, the contents of which are incorporated herein by reference.

TECHNICAL FIELD

The present disclosure relates to a crash box that is deformed in the event of a collision of a vehicle to absorb collision energy, and a manufacturing method of the same.

BACKGROUND

A known crash box is placed between a bumper reinforcement provided in a front portion of a vehicle and a hollow side member (side frame) provided on a side of the vehicle and is configured to be deformed in the event of a collision of the vehicle, so as to absorb the collision energy (as described in, for example, Patent Literature 1). A crash box described in Patent Literature 1 has a tubular body that is formed by deep drawing of a steel plate and that has a bottomed leading end and a flange formed around an outer periphery of an opening end. A bottom of the leading end is fixed to the bumper reinforcement, and the flange is fixed to a mounting portion that is provided in the outer periphery of the opening end of the side member. A part from the opening end of the tubular body to the flange is formed as an inverting part that is curled in a trough shape toward the bumper reinforcement side. This crash box has a turning deformation that causes the tubular body to enter the side member from the inverting part as the starting point, in the event of a collision of the vehicle, so as to absorb the collision energy.

CITATION LIST

Patent Literature

PTL 1: JP 2003-312401A

SUMMARY

In the event of a collision of the vehicle, in the case where a collision force is generated in a front direction to cause the tubular body to enter the side frame, the crash box described above has the turning deformation of the tubular body and thereby appropriately absorbs the collision energy. The collision force is, however, expected to be generated in various directions in the event of a collision of the vehicle. In the case of a collision force in an oblique direction, the tubular body is likely to be bent in a lateral direction and is unlikely to enter the side frame. In this case, the crash box is likely to fail to sufficiently absorb the collision energy by the turning deformation.

A crash box of the present disclosure mainly aims to more appropriately absorb collision energy.

In order to achieve the above primary object, the crash box of the present disclosure employs the following configuration.

The present disclosure is directed to a crash box. The crash box includes a pedestal portion attached to one of two members that are placed in an inward-outward direction of a vehicle, and a bottomed tubular portion integrally molded with the pedestal portion and configured to include a base end portion that is arranged to rise from the pedestal portion and an extended portion that is extended from the base end portion and that has a leading end wall which forms a bottom of the tubular portion and which is attached to the other of the two members, wherein the tubular portion is configured such that a side wall of the extended portion has a smaller thickness than a thickness of a side wall of the base end portion.

In the crash box according to this aspect of the present disclosure, the pedestal portion attached to one of the two members that are placed in the inward-outward direction of the vehicle, is integrally molded with the tubular portion configured to include the base end portion that is arranged to rise from the pedestal portion and the extended portion that is extended from the base end portion and that has the leading end wall which forms the bottom of the tubular portion and which is attached to the other of the two members. The tubular portion is formed such that the side wall of the extended portion has the smaller thickness than the thickness of the side wall of the base end portion. This configuration increases the rigidity of the base end portion to be higher than the rigidity of the extended portion. This accordingly encourages deformation (collapse) of the extended portion with respect to a wider range of collision to absorb collision energy. Integral molding of the crash box that has different thicknesses in the tubular portion prevents the occurrence of a joint part of the lower strength and suppresses breakage of the crash box at a joint part in the event of a collision of the vehicle. As a result, this configuration more appropriately absorbs the collision energy in the event of a collision of the vehicle. One of the two members that are placed in the inward-outward direction of the vehicle may be, for example, a side member provided on a side of the vehicle. The other may be a bumper reinforcement provided in a front portion of the vehicle. The extended portion may be extended in a direction identical with the rising direction of the base end portion.

In the crash box of this aspect, the tubular portion may be formed to have an outer diameter of the base end portion increasing from an extended portion side thereof toward a pedestal portion side thereof. This configuration further increases the rigidity of the base end portion and causes the extended portion to be relatively readily deformed. This accordingly furthermore appropriately absorbs the collision energy.

In the crash box of another aspect, the leading end wall and the pedestal portion may be formed to have larger thicknesses than the thickness of the side wall of the extended portion. This configuration increases the rigidities of the leading end wall and the pedestal portion that are attached to the component members of the vehicle and causes the extended portion to be relatively readily deformed. This configuration accordingly prevents unintentional deformation at a position attached to the member of the vehicle in the event of a collision of the vehicle and furthermore appropriately absorbs the collision energy.

In the crash box of another aspect, the tubular portion may have a recess that is formed in the side wall of the extended portion. This configuration causes deformation of the extended portion from the recess as the starting point in the event of a collision of the vehicle and thus causes the extended portion to be more readily deformed.

The present disclosure is also directed to a manufacturing method of a crash box. The manufacturing method of a crash box includes performing deep drawing to integrally mold a pedestal portion and a bottomed tubular portion that rises from the pedestal portion, from one metal plate, and performing ironing to reduce a thickness of a side wall of a bottom side to be smaller than a thickness of a side wall of a pedestal portion side of the tubular portion molded by the deep drawing.

The manufacturing method of the crash box according to this aspect of the present disclosure includes performing the deep drawing to integrally mold the pedestal portion and the bottomed tubular portion rising from the pedestal portion, from one metal plate; and performing the ironing to reduce the thickness of the side wall of the bottom side to be smaller than the thickness of the side wall of the pedestal portion side of the tubular portion molded by the deep drawing. The ironing forms the bottom side part of the tubular portion as an extended portion that has a smaller thickness of the side wall, while forming the pedestal portion side part as a base end portion that has a larger thickness of the side wall. This accordingly increases the rigidity of the base end portion on the pedestal portion side to be higher than the rigidity of the extended portion on the bottom side. This encourages deformation (collapse) of the extended portion on the bottom side with respect to a wider range of collision to absorb the collision energy. Integral molding of the crash box that has different thicknesses in the tubular portion from one metal plate prevents the occurrence of a joint part of the lower strength and suppresses breakage of the crash box at a joint part in the event of a collision of the vehicle. The crash box configured to more appropriately absorb the collision energy in the event of a collision of the vehicle can thus be manufactured without any complicated processing.

DESCRIPTION OF EMBODIMENTS

The following describes some aspects of the disclosure with reference to embodiments.

Figure 1:
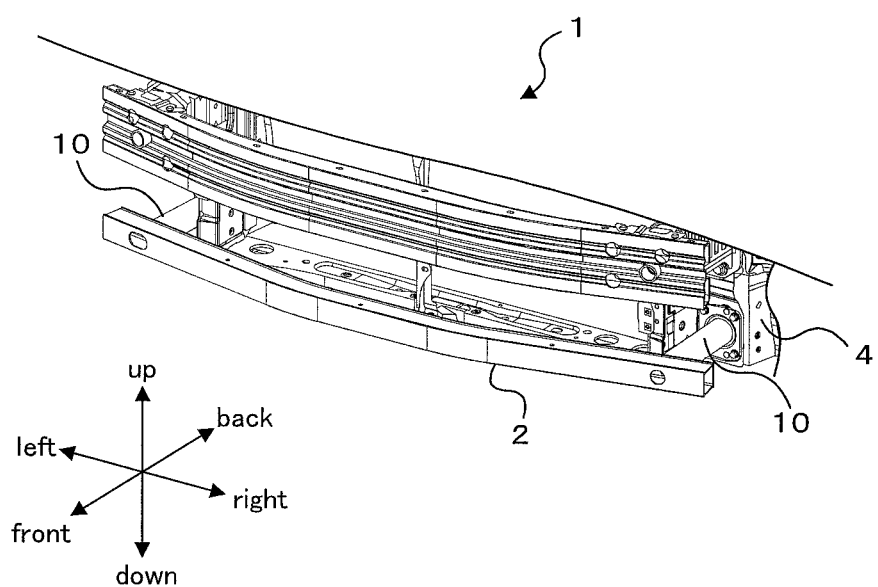
FIG. 1 is an appearance diagram illustrating the appearance of a bumper device including a crash box according to one embodiment of the present disclosure.
Figure 2:
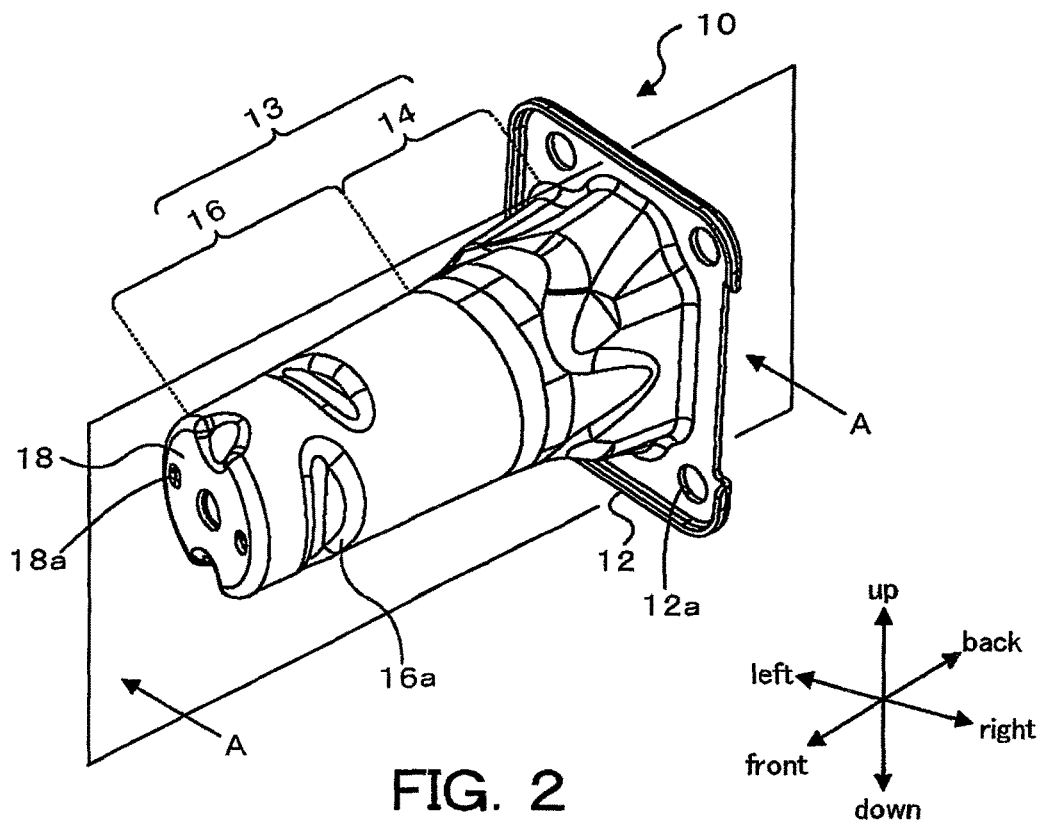
FIG. 2 is an appearance perspective view illustrating the crash box.
Figure 3:
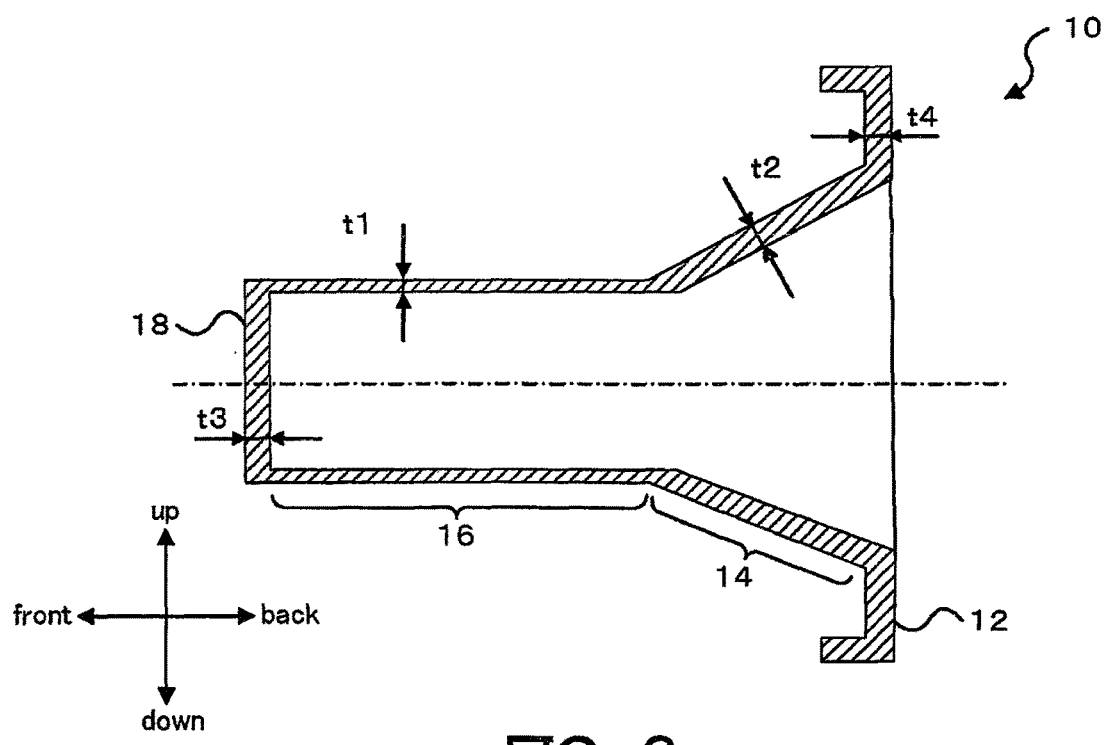
FIG. 3 is a sectional view illustrating an A-A section of FIG. 2.

FIG. 1 is an appearance diagram illustrating the appearance of a bumper device 1 including a crash box 10 according to one embodiment of the present disclosure. FIG. 2 is an appearance perspective view illustrating the crash box 10. FIG. 3 is a sectional view illustrating an A-A section of FIG. 2. In the description below, a front-back direction, a left-right direction, and an up-down direction are those shown in FIG. 1 and FIG. 2.

As shown in FIG. 1, the bumper device 1 of the embodiment includes a bumper reinforcement 2 that is provided in a front part of a vehicle along a width direction (left-right direction), side members 4 that are provided on respective sides of the vehicle along the front-back direction, and crash boxes 10 that are provided between a rear face of the bumper reinforcement 2 and front faces of the side members 4 and that are configured to be deformed in the event of a collision of the vehicle and thereby absorb a collision energy. The crash boxes 10 are respectively provided on the left side and on the right side. The crash boxes 10 have an identical structure, so that the following description does not specifically distinguish between the respective crash boxes 10.

As shown in FIG. 2 and FIG. 3, the crash box 10 is an integrally molded member of a rectangular flat plate-like pedestal portion 12 having insertion holes 12a formed at four corners thereof and a hollow tubular portion 13 arranged to rise from the pedestal portion 12. Bolts inserted in the insertion holes 12a are fastened to female threaded holes formed in the side member 4, so that the pedestal portion 12 is fixed to the side member 4. The tubular portion 13 includes a truncated cone portion 14 arranged to rise in an approximately truncated cone shape from the pedestal portion 12, and a cylindrical portion 16 extended in a cylindrical shape from the truncated cone portion 14 in a direction (forward direction) identical with the rising direction of the truncated cone portion 14. The tubular portion 13 is formed in a bottomed tubular shape.

The truncated cone portion 14 of the tubular portion 13 has an outer diameter decreasing in a direction from the pedestal portion 12-side toward the cylindrical portion 16-side (i.e., outer diameter increasing in a direction from the cylindrical portion 16-side toward the pedestal portion 12-side). Two fastening holes 18a are formed as female threaded holes in a leading end wall 18 that forms a bottom of the cylindrical portion 16. Bolts inserted in insertion holes formed in the bumper reinforcement 2 are fastened to the fastening holes 18a of the leading end wall 18, so that the leading end wall 18 is fixed to the bumper reinforcement 2. A plurality of recesses 16a are formed in a side wall of the cylindrical portion 16. The illustration of the recesses 16a is omitted from FIG. 3.

As shown in FIG. 3, in the crash box 10, a thickness t1 of the side wall of the cylindrical portion 16 is smaller than a thickness t2 of a side wall of the truncated cone portion 14. According to the embodiment, a thickness t3 of the leading end wall 18 of the cylindrical portion 16 and a thickness t4 of the pedestal portion 12 are both equivalent to the thickness t2 of the truncated cone portion 14. Accordingly, the thickness t3 of the leading end wall 18 of the cylindrical portion 16 and the thickness t4 of the pedestal portion 12 are larger than the thickness t1 of the side wall of the cylindrical portion 16.

FIGS. 4A to 4E are diagrams illustrating a process of manufacturing the crash box 10. The crash box 10 of the embodiment is integrally formed through a deep drawing process that performs deep drawing of one metal plate P (shown in FIG. 4A) as a material and an ironing process that performs ironing. The metal plate P used may be a cold rolled steel plate such as SPCD.

The deep drawing process performs multiple stages of deep drawing. The process of FIGS. 4A to 4E illustrates three-stage deep drawing of FIGS. 4B to 4D as one example. The deep drawing process may be one stage, two stages or four or more multiple stages. Each stage performs deep drawing to form a predetermined shape by using a non-illustrated die and a non-illustrated punch. For example, a first stage shown in FIG. 4B forms a large-diameter bottomed cylindrical work 10A from the metal plate P. A second stage shown in FIG. 4C forms a work 10B by reducing the outer diameter of the cylindrical portion and increasing the depth (height) of the cylindrical portion. A third stage shown in FIG. 4D forms a stepped cylindrical work 10C by processing the cylindrical portion to an outer diameter part corresponding to the cylindrical portion 16 and an outer diameter part corresponding to the truncated cone portion 14. With the progress of the stage, the punch of the smaller diameter is used for deep drawing.

Figure 4A:
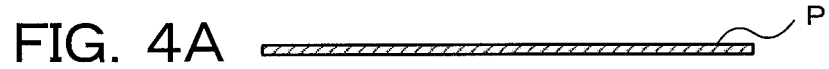
FIG. 4A is a diagram illustrating a process of manufacturing the crash box.
Figure 4B:
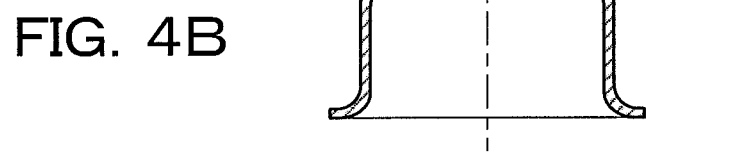
FIG. 4B is a diagram illustrating a process of manufacturing the crash box.
Figure 4C:
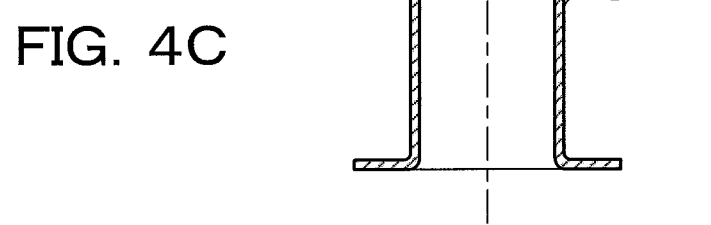
FIG. 4C is a diagram illustrating a process of manufacturing the crash box.
Figure 4D:
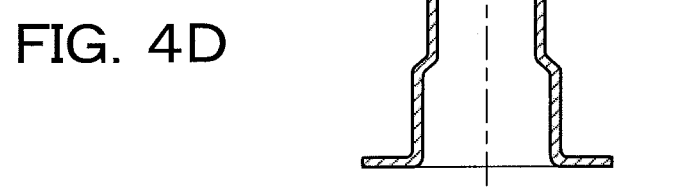
FIG. 4D is a diagram illustrating a process of manufacturing the crash box.
Figure 4E:
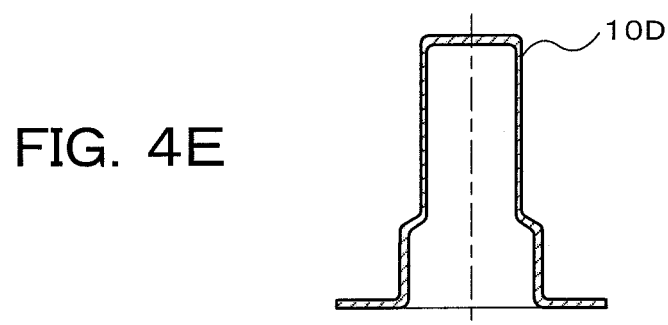
FIG. 4E is a diagram illustrating a process of manufacturing the crash box.

The process of FIG. 4E performs ironing of the work 10C formed by the deep drawing process described above to reduce the thickness of a side wall of a leading end side (bottom side) of the cylindrical portion. The process of FIG. 4E performs ironing to reduce the thickness of the side wall of the part corresponding to the cylindrical portion 16 to a predetermined thickness (thickness t1) and to stretch the part corresponding to the cylindrical portion 16 to a predetermined height, by using a non-illustrated die and a non-illustrated punch. Although not being illustrated, the work 10D after ironing is further processed to form the shape of the truncated cone portion 14 by expanding the diameter of the part corresponding to the truncated cone portion 14 and to form the shape of the pedestal portion 12 by laser processing and trimming a flange and bending an edge. A subsequent process forms the plurality of recesses 16a in the side wall of the part corresponding to the cylindrical portion 16, forms the insertion holes 12a in the pedestal portion 12, and forms the fastening holes 18a in the leading end wall 18 of the tubular portion 13. This completes the crash box 10.

Figure 5A:
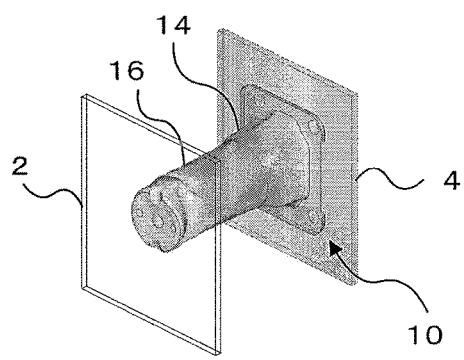
FIG. 5A is a diagram illustrating deformation of the crash box.
Figure 5D:
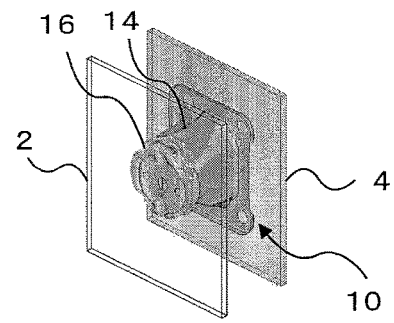
FIG. 5D is a diagram illustrating deformation of the crash box.
Figure 5B:
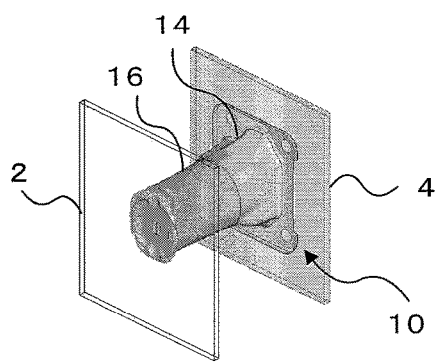
FIG. 5B is a diagram illustrating deformation of the crash box.
Figure 5E:
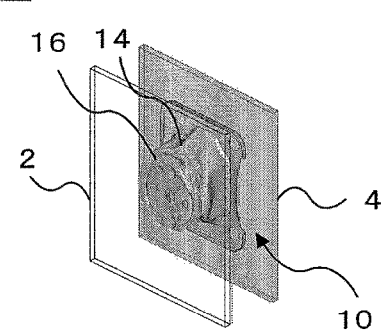
FIG. 5E is a diagram illustrating deformation of the crash box.
Figure 5C:
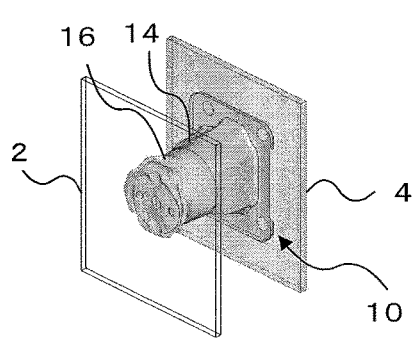
FIG. 5C is a diagram illustrating deformation of the crash box.
Figure 5F:
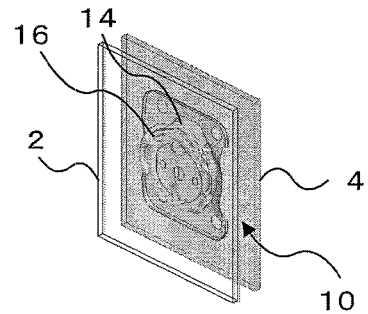
FIG. 5F is a diagram illustrating deformation of the crash box.

The following describes deformation of the crash box 10 of the embodiment by, for example, a collision of the vehicle. FIGS. 5A to 5F are diagrams illustrating deformation of the crash box 10. As illustrated, when the bumper reinforcement 2 is pressed in toward the side member 4 by a collision, the crash box 10 starts collapsing (starts deforming) from the cylindrical portion 16 that has the smaller thickness than that of the truncated cone portion 14 and thereby has the lower rigidity (as shown in FIGS. 5A to 5C). As described above, the leading end wall 18 and the pedestal portion 12 have the larger thicknesses t3 and t4 than the thickness t1 of the cylindrical portion 16 and have the higher rigidities. Accordingly, the leading end wall 18 and the pedestal portion 12 have smaller degrees of deformation, compared with the cylindrical portion 16. After the cylindrical portion 16 mostly collapses (as shown in FIG. 5D), the truncated cone portion 14 starts collapsing (as shown in FIG. 5E and FIG. 5F). The crash box 10 is integrally molded and does not have a joint part of the lower strength. There is accordingly no unintentional breakage in a lower strength part such as a joint part. The configuration of reducing the thickness of the cylindrical portion 16 than the thickness of the truncated cone portion 14 encourages deformation of the cylindrical portion 16. FIGS. 5A to 5F illustrate the case where the bumper reinforcement 2 is not inclined but is pressed in parallel toward the side member 4. Even in the case where the bumper reinforcement 2 is inclined and is pressed in, a collision load is applied to the cylindrical portion 16, so that deformation starts from the cylindrical portion 16. This configuration accordingly encourages deformation (collapse) of the cylindrical portion 16 with respect to a relatively wide range of the collision direction to absorb the collision energy.

The crash box 10 of the embodiment described above is integrally molded and has the pedestal portion 12 that is attached to the side member 4, and the tubular portion 13 including the truncated cone portion 14 that rises from the pedestal portion 12 and the cylindrical portion 16 that is extended from the truncated cone portion 14 and has the leading end wall 18 attached to the bumper reinforcement 2. The tubular portion 13 is formed such that the side wall of the cylindrical portion 16 has the smaller thickness than the thickness of the side wall of the truncated cone portion 14. This configuration increases the rigidity of the truncated cone portion 14 to be higher than the rigidity of the cylindrical portion 16 and thereby encourages deformation (collapse) of the cylindrical portion 16 with respect to a relatively wide range of the collision direction to absorb the collision energy. Integral molding of the crash box 10 suppresses a breakage of the crash box 10 at an unintentional position in the event of a collision of the vehicle. As a result, this configuration more appropriately absorbs the collision energy in the event of a collision of the vehicle.

In the tubular portion 13, the truncated cone portion 14 is formed to have the outer diameter increasing from the cylindrical portion 16-side toward the pedestal portion 12-side. This increases the rigidity of the truncated cone portion 14 and causes the cylindrical portion 16 to be readily deformed. This configuration furthermore appropriately absorbs the collision energy.

The leading end wall 18 of the cylindrical portion 16 and the pedestal portion 12 are formed to have the larger thicknesses than the thickness of the side wall of the cylindrical portion 16. This configuration increases the rigidities at the positions attached to the side member 4 and to the bumper reinforcement 2. This configuration accordingly prevents unintentional deformation at the position attached to the side member 4 or to the bumper reinforcement 2 in the event of a collision of the vehicle and furthermore appropriately absorbs the collision energy.

In the tubular portion 13, the recesses 16a are formed in the side wall of the cylindrical portion 16. This configuration causes deformation of the cylindrical portion 16 from the recess 16a as the starting point in the event of a collision of the vehicle. This configuration causes the cylindrical portion 16 to be more readily deformed.

The embodiment employs the manufacturing method including the process of performing deep drawing to integrally mold the parts corresponding to the pedestal portion 12 and the tubular portion 13 from one metal plate and the process of performing ironing to reduce the thickness of the side wall of the leading end side to be smaller than the thickness of the side wall of the pedestal portion side in the part corresponding to the tubular portion 13 molded by deep drawing. The crash box 10 having the advantageous effects described above is thus manufactured by the relatively simple processing.

In the crash box 10 of the embodiment, the truncated cone portion 14 is arranged to rise in the approximately truncated cone shape from the pedestal portion 12. This configuration is, however, not essential. The truncated cone portion 14 may be arranged to rise in a truncated pyramid shape (for example, truncated quadrangular pyramid shape) from the pedestal portion 12. The truncated cone portion 14 is formed to have the outer diameter increasing from the cylindrical portion 16-side toward the pedestal portion 12-side. This configuration is, however, not essential. The truncated cone portion 14 may rise to have an approximately fixed outer diameter (for example, in a cylindrical shape or in a square tube shape). In this case, the tubular portion 13 may be formed in a stepped cylindrical shape by increasing the outer diameter of the truncated cone portion 14 to be larger than the outer diameter of the cylindrical portion 16.

In the crash box 10 of the embodiment, the leading end wall 18 and the pedestal portion 12 are formed to respectively have the thickness t3 and the thickness t4 that are equivalent to the thickness t2 of the truncated cone portion 14 and that are thereby larger than the thickness t1 of the side wall of the cylindrical portion 16. This configuration is, however, not essential. For example, the leading end wall 18 and the pedestal portion 12 may be formed to have the thickness t3 and the thickness t4 that are larger than the thickness t2 of the truncated cone portion 14 or may be formed to have the thickness t3 and the thickness t4 that are smaller than the thickness t2 of the truncated cone portion 14 and that are larger than the thickness t1 of the side wall of the cylindrical portion 16. In another example, at least one of the thickness t3 of the leading end wall 18 and the thickness t4 of the pedestal portion 12 may be equivalent to the thickness t1 of the side wall of the cylindrical portion 16.

In the crash box 10 of the embodiment, the plurality of recesses 16a are formed in the side wall of the cylindrical portion 16 of the tubular portion 13. This configuration is, however, not essential. Only one recess 16a may be formed or no recess 16a may be formed.

The crash box 10 of the embodiment is manufactured by the manufacturing method including the process of performing deep drawing and the process of performing ironing. This manufacturing method is, however, not essential. The crash box 10 may be manufactured by a manufacturing method that includes another processing, for example, rearward extrusion or machining.

In the crash box 10 of the embodiment, the pedestal portion 12 is attached to (fixed to) the side member 4, and the leading end wall 18 is attached to (fixed to) the bumper reinforcement 2. This configuration is, however, not essential. Any other configuration may be employed as long as the pedestal portion 12 is attached to one of two members that are placed in an inward-outward direction of the vehicle and the leading end wall 18 is attached to the other. The crash box 10 may not be necessarily mounted by means of bolts but may be mounted by another technique such as welding.

The following describes the correspondence relationship between the primary components of the embodiment and the primary components of the disclosure described in Summary. The crash box 10 of the embodiment corresponds to the "crash box", the pedestal portion 12 corresponds to the "pedestal portion", the truncated cone portion 14 corresponds to the "base end portion", the cylindrical portion 16 corresponds to the "extended portion", and the tubular portion 13 corresponds to the "tubular portion". The recesses 16a corresponds to the "recess".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the crash box and so on.

The invention claimed is:

1. A crash box, comprising:
a pedestal portion attached to one of two members that are placed in an inward-outward direction of a vehicle; and
a bottomed tubular portion integrally molded with the pedestal portion and configured to include a base end portion that is arranged to rise from the pedestal portion and an extended portion that is extended from the base end portion and that has a leading end wall which forms a bottom of the tubular portion and which is attached to the other of the two members, wherein the tubular portion is configured such that a side wall of the extended portion has a smaller thickness than a thickness of a side wall of the base end portion,
wherein the leading end wall and the pedestal portion are formed to have larger thicknesses than the thickness of the side wall of the extended portion.

2. The crash box according to claim 1,
wherein the tubular portion is formed to have an outer diameter of the base end portion increasing from an extended portion side thereof toward a pedestal portion side thereof.

3. The crash box according to claim 1,
wherein the tubular portion has a recess that is formed in the side wall of the extended portion.

4. A method of manufacturing a crash box, comprising:
performing deep drawing to integrally mold a pedestal portion and a bottomed tubular portion that rises from the pedestal portion, from one metal plate; and
performing ironing to reduce a thickness of a side wall of a bottom side to be smaller than a thickness of a side wall of a pedestal portion side of the tubular portion molded by the deep drawing,
wherein in the crash box manufactured in the method,
the bottomed tubular portion is configured to include a base end portion that is arranged to rise from the pedestal portion and an extended portion that is extended from the base end portion and that has a leading end wall which forms a bottom of the tubular portion, and
the leading end wall and the pedestal portion are formed to have larger thicknesses than the thickness of a side wall of the extended portion.

* * * * *